July 14, 1964     A. C. SAMPIETRO     3,140,757
LUBRICATION SYSTEM
Filed May 28, 1962
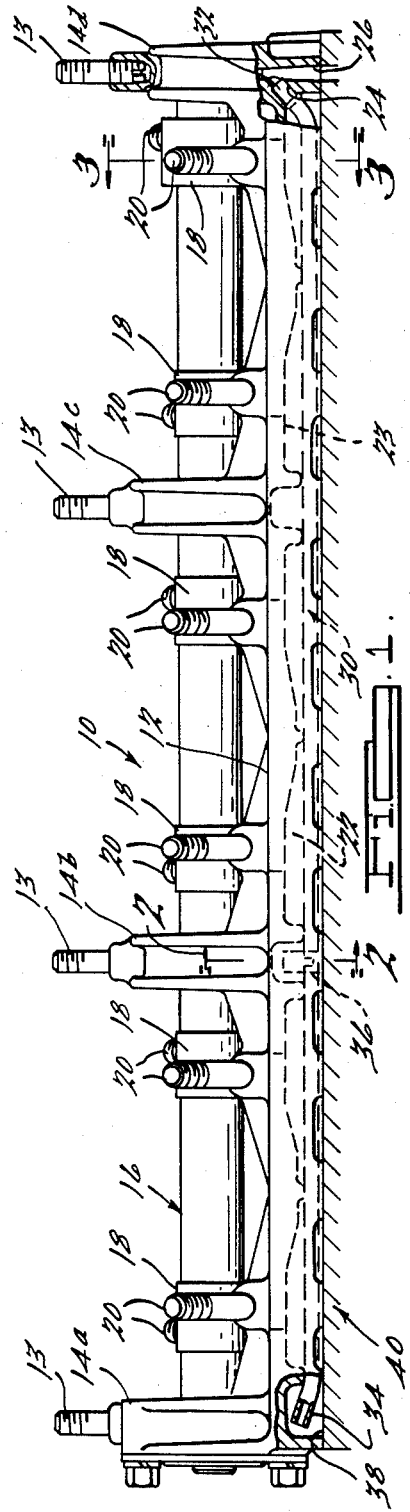
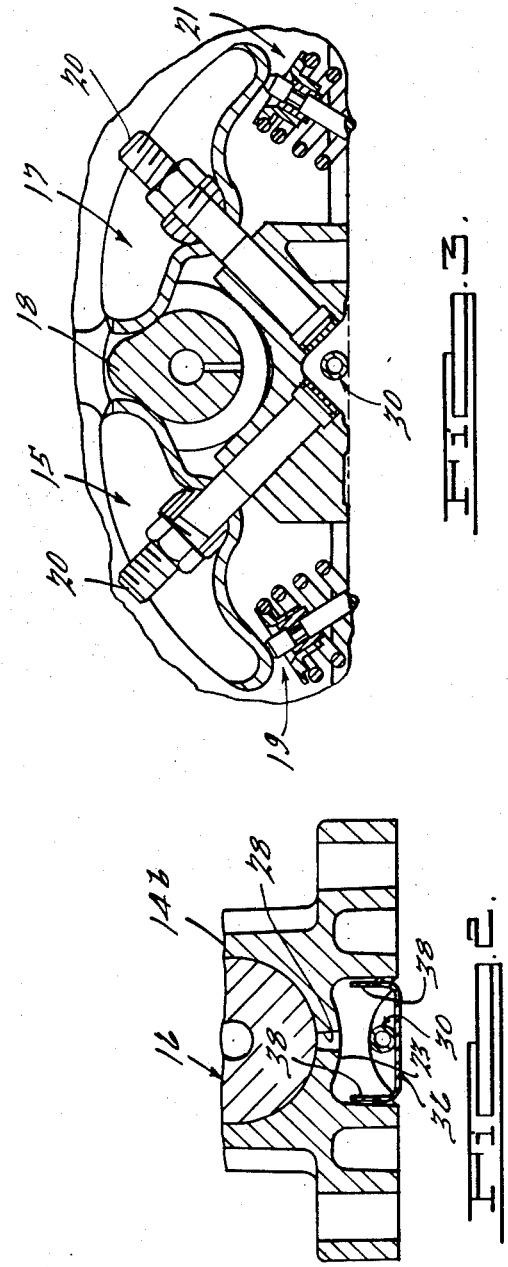
INVENTOR.
Achilles C. Sampietro
BY
Harness, Dickey  Pierce
ATTORNEYS.

United States Patent Office 3,140,757
Patented July 14, 1964

3,140,757
LUBRICATION SYSTEM
Achilles C. Sampietro, Bloomfield Hills, Mich., assignor to Willys Motors, Inc., Toledo, Ohio, a corporation of Nevada
Filed May 28, 1962, Ser. No. 198,337
7 Claims. (Cl. 184—6)

This invention relates to lubrication systems and more particularly to a lubrication system for use for an internal combination engine having an overhead camshaft.

Conventionally, a camshaft is journaled in a plurality of bearing blocks with each of the bearing blocks placed in communication with the lubrication system of the engine such that the journals on the camshaft and the associated bearings are continuously lubricated. With overhead camshaft engines, it is common for a fluid reservoir or chamber to be provided between the cylinder head and the cam bearing deck assembly, which reservoir is fluid communicated to each of the plurality of cam bearing blocks which rotatably carry the camshaft. The reservoir, which extends longitudinally with respect to the length of the engine block, is in turn connected to the lubrication system whereby lubricant is supplied under pressure into the reservoir and thence through passageways to the plurality of bearing blocks.

Oftentimes the engine assembly is mounted with its longitudinal axis at an angle with the horizontal; likewise, oftentimes the vehicle is parked on an inclined surface, i.e., side drive, etc., thereby inclining the engine assembly relative to the horizontal. With the engine assembly disposed at an angle with respect to the horizontal, the lubricant in the fluid reservoir is caused to flow to one end of the reservoir; if the engine is inclined in a given direction, the fluid can flow out through the fluid input to the reservior and back into the fluid supply. Subsequently upon starting the engine, no lubrication is provided to the bearings in which the camshaft is jonrnaled until the reservoir is filled with oil and a pressure applied thereto whereby the oil can be forced through the passageways communicating the reservoir to the bearing blocks. At these times when the reservoir has drained it is possible for the camshaft and/or the bearings in the bearing blocks to be damaged due to the temporary lack of lubrication therebetween. The lubrication system of this invention solves that problem; therefore, it is an object of this invention to provide a lubrication system for use with overhead camshaft type engines in which means are provided whereby the fluid reservoir feeding the overhead camshaft is prevented from draining when the longitudinal axis of the engine is inclined with respect to the horizontal.

It is another object of this invention to provide means for substantially preventing drainage of a fluid from a longitudinally extending reservoir having an inlet at one end when that reservoir is inclined with respect to the horizontal.

Other objects, features, and advantages of the present invention will become apparent from the subsequent description and the appended claims, taken in conjunction with the accompanying drawings, in which:

FIGURE 1 is a side elevational view of a cam bearing assembly for an overhead camshaft engine with some parts shown broken away and some parts shown in section and depicted in relation to a cylinder head, partially shown;

FIGURE 2 is a sectional view of the cam bearing deck assembly shown in FIGURE 1 and taken substantially along the line 2—2 of FIGURE 1; and FIGURE 3 is a sectional view of the cam bearing deck assembly as shown in FIGURE 1 and taken substantially along the line 3—3 of FIGURE 1 and further including rocker arm assemblies and a portion of the associated valve assemblies.

Looking now to FIGURE 1, a cam bearing deck assembly is generally indicated by the numeral 10 and includes a longitudinally extending cam bearing deck 12 having secured thereto a plurality of longitudinally spaced bearing blocks 14a–14d into which a camshaft 16 is journaled. Each of the bearing block members 14a–14d has a stud 13 extending generally vertically upwardly therefrom for securing a valve cover (not shown) thereto. The camshaft 16 has a plurality of longitudinally spaced cam lobes 18 each of which is operative with a pair of rocker arm assemblies exemplified by assemblies 15 and 17 in FIGURE 3, for operating the associated valve assemblies 19 and 21. Extending outwardly and transversely from the cam bearing deck 12 on opposite sides of the camshaft 16 are each of a plurality of pairs of studs 20 which serve as a means for securing the rocker arm assemblies 15 and 17 thereto. The construction and operation of rocker arm assemblies 15 and 17 and their respective valve assemblies 19 and 21 are well known to those skilled in the art and will not be described herein in detail. Disposed on the bottom portion of the cam bearing deck 12 is a longitudinally extending cavity 23 which has a passageway 24 which communicates with the cavity 23 proximate to its upper wall; the passageway 24 in turn is in fluid communication with a passage 26 which is connected to a source of lubrication under pressure (not shown). Since the cam bearing deck 12 is mounted with its bottom portion flush with a flat upper surface 38 of a cylinder head 40, the cavity 23 thereby defines an enclosed reservoir 22.

The reservoir 22 is communicated to the bearing surfaces of each of the bearing block members 14a–14c via a fluid passage 28 (see FIGURE 2) which extends upwardly from the upper wall of the reservoir 22. Disposed within the reservoir 22 is a longitudinally extending inlet tube member 30 which terminates at its forward end, and at the forward end of reservoir 22, in an upwardly turned connecting or inlet portion 32 which is matably disposed within the passageway 24 to thereby provide that fluid under pressure from input passage 26 must pass through the connecting portion 32 and into the tube 30 before passing into the reservoir 22. The opposite or rearward end of the tube 30 terminates in an upwardly turned outlet portion 34 disposed proximate the upper wall of and near the rear end of the reservoir 22.

A generally U-shaped clip 36 has a pair of leg portions 38 with prongs thereon for engaging the side walls of the reservoir 22 and thereby retains the tube 30 within the reservoir 22. By so securing the tube 30, assembly of the cam bearing deck assembly 10 to the cylinder head 40 is simplified and movement of the tube 30 within the reservoir 22 is prevented.

In operation, lubricant is pumped under pressure to the input passage 26 through the connecting portion 32, through the tube 30 and out from the outlet portion 34 into the reservoir 22. As the reservoir is filled, lubricant is forced under pressure through the plurality of passages 28 to the bearing blocks 14a–14c to thereby provide lubrication between the bearing surfaces of blocks 14a–14c and the camshaft 16. The bearing surface of bearing block 14d is lubricated directly from input passage 26.

Assuming for the moment that the tube 30 were removed from the reservoir 22, it can be seen that if the cam bearing deck assembly 10 were rotated or tilted in a clockwise direction in the plane of the paper of the drawing, assuming the engine is off thereby removing the pressure from the passage 26, the oil in the reservoir 22 would be free to flow towards the passageway 24 and out therethrough into the passage 26 and thence back to the source. Upon starting the engine, some time would be required before fluid could be pumped to again fill the reservoir 22. During this interim period the bearing surfaces between the camshaft 16 and the bearing blocks 14a–14c would be unlubricated with the result of possible damage to and/or failure of these parts. By the installation of the tube 30 in the manner as shown in the drawing, the cam bearing deck assembly 10 could be rotated clockwise 90° without any appreciable loss of oil from the reservoir 22. Of course, if the cam bearing deck assembly 10 were rotated in a counterclockwise direction, there would be no loss of oil since, in that position, fluid from the reservoir 22 cannot flow into the input passage 26. Thus it can be seen that by means of the construction shown in the drawing, regardless of the inclination of the engine and hence of the cam bearing deck assembly 10, the fluid reservoir 22 will always be substantially maintained filled with oil thus allowing almost immediate lubrication of the camshaft 16 and the bearing block assemblies 14a–14c upon starting.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. Apparatus comprising a longitudially extending body having a longitudinal axis disposed in a generally horizontal plane and having a front and a rear end, a longitudinally extending oil reservoir in said body partially defined by an upper wall therein, an input passage connected to a selectively pressurizable source of fluid and disposed at said front end of said body, and a tube member disposed in said reservoir and extending substantially longitudially of said body for supplying fluid to said reservoir, said tube member having an inlet disposed proximate to said upper wall and connected in fluid communication with said input passage and an outlet in fluid communication with said reservoir at said rear end and proximate to said upper wall.

2. In an overhead camshaft engine a cam bearing deck assembly having a plurality of bearing block members rotatably carrying a camshaft on a longitudinally extending cam bearing deck member, a longitudinally extending cavity in the bottom side of said cam deck member partially defined by an upper wall and partially defining a fluid reservoir, an input passage connected to a selectively pressurizable source of fluid and disposed at one end of said bearing deck member and of said reservoir, a passageway at said one end of said reservoir in fluid communication with said input passage, a tube member disposed within said reservoir having a connecting inlet end portion proximate to said upper wall and connected within said passageway in fluid communication with said input passage and terminating at the opposite end in an outlet end portion proximate to said upper wall and in communication with said reservoir, a plurality of passageways fluid communicating each of said bearing block members with said fluid reservoir.

3. In an overhead camshaft engine a cam bearing deck assembly having a plurality of bearing block members rotatably carrying a camshaft on a longitudinally extending cam bearing deck member, a longitudinally extending cavity in the bottom side of said cam deck member partially defined by an upper wall and partially defining a fluid reservoir, an input passage connected to a selectively pressurizable source of fluid and disposed at one end of said bearing deck member and of said reservoir, a passageway at said one end of said reservoir in fluid communication with said input passage, a tube member disposed within said reservoir having a connecting inlet end portion connected within said passageway in fluid communication with said input passage and terminating at the opposite end in an upwardly extending outlet end portion proximate to said upper wall and in communication with said reservoir, a plurality of passageways fluid communicating each of said bearing block members with said fluid reservoir.

4. In an overhead camshaft engine a cam bearing deck assembly having a plurality of bearing block members rotatably carrying a camshaft on a longitudinally extending cam bearing deck member, a longitudinally extending cavity in the bottom side of said cam deck member partially defined by an upper wall and partially defining a fluid reservoir, an input passage connected to a selectively pressurizable source of fluid and disposed at one end of said bearing deck member and of said reservoir, a passageway at said one end of said reservoir in fluid communication with said input passage, a tube member disposed within said reservoir having an upwardly extending connecting inlet end portion proximate to said upper wall and connected within said passageway in fluid communication with said input passage and terminating at the opposite end in an upwardly extending outlet end portion proximate to said upper wall and in communication with said reservoir.

5. In an overhead camshaft engine a cam bearing deck assembly having a plurality of bearing block members rotatably carrying a camshaft on a longitudinally extending cam bearing deck member, a longitudinally extending cavity in the bottom side of said cam deck member partially defined by an upper wall, said cam deck fixedly disposed upon an upper surface of a cylinder head member with said cavity and said upper surface defining a reservoir, an input passage connected to a selectively pressurizable source of fluid and disposed at one end of said bearing deck member and of said reservoir, a passageway in said cam deck member at said one end of said reservoir in fluid communication with said input passage, a tube member disposed within said reservoir having an upwardly extending connecting inlet end portion proximate to said upper wall and connected within said passageway in fluid communication with said input passage and terminating at the opposite end in an upwardly extending outlet end portion proximate to said upper wall and in communication with said reservoir, a plurality of passageways fluid communicating each of said bearing block members with said fluid reservoir.

6. The assembly of claim 5 further including clip means disposed intermediate said end portions of said tube member for securing said tube member to said cam bearing deck member.

7. For use with an engine, a cam bearing deck assembly having a plurality of bearing block members for supporting a cam shaft for rotation on a longitudinally extending cam bearing deck member, a longitudinally extending cavity in the bottom side of said cam deck member partially defined by an upper wall and partially defining an oil reservoir to be supplied by a selectively pressurizable source of oil, and fluid passage means for connecting said reservoir to the source of oil, said fluid passage means comprising inlet means for fluid communicating with said reservoir at one end of said cam deck member, fluid path means for fluid communicating with said inlet means and extending longitudinally to the opposite end of said reservoir at the other end of said cam deck member, and input passage means for fluid communicating between said fluid path means at said opposite end and the source of oil, said fluid passage means having at least one point at substantially the same level as said upper wall.

References Cited in the file of this patent

UNITED STATES PATENTS

| 1,102,605 | Pembroke | July 7, 1914 |
| 1,256,242 | Marmon | Feb. 12, 1918 |
| 1,987,366 | Ford | Jan. 8, 1935 |